United States Patent [19]

Malatesta

[11] 3,852,253
[45] Dec. 3, 1974

[54] HETEROGENEOUS PROCESS FOR PREPARING CONJUGATED DIENE BUTYL

[75] Inventor: Alberto Malatesta, Brussels, Belgium

[73] Assignee: Esso Research and Engineering Company, Linden, N.J.

[22] Filed: Dec. 22, 1972

[21] Appl. No.: 317,715

[52] U.S. Cl. ..................... 260/85.3 H, 260/85.3 C
[51] Int. Cl. ....................... C08d 3/04, C08d 13/32
[58] Field of Search ................... 260/85.3 C, 85.3 H

[56] References Cited
UNITED STATES PATENTS
3,084,142  4/1963  Cottle et al. ................... 260/85.3 H
3,646,166  2/1972  Canter ............................. 260/879

Primary Examiner—Joseph L. Schoffer
Assistant Examiner—A. Holler

[57] ABSTRACT

Dehydrohalogenation of halogenated butyl rubber to produce a butyl rubber having conjugated double bonds, a major portion of which are in the linear backbone. The process produces a composition having the schematic formula:

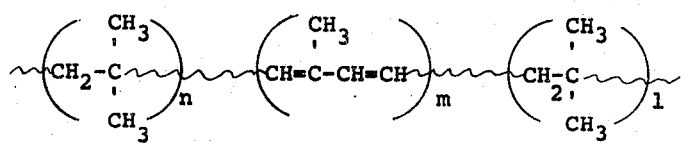

where $n + 1$ represent the number of isoolefin units incorporated in the butyl rubber polymer backbone, and $m$ represents the number of conjugated diolefin units present, substantially as randomly inserted units. The process for preparing the above compositions comprises contacting a solution of halogenated butyl rubber with a strong mineral acid salt of a metal selected from the metals of Groups IIa and IIb of the Periodic Table. Both brominated and chlorinated butyl rubber may be used in the present process to produce a butyl rubber having greater than about 0.4 mole percent conjugated diene unsaturation present in the polymer.

11 Claims, No Drawings

HETEROGENEOUS PROCESS FOR PREPARING CONJUGATED DIENE BUTYL

BACKGROUND OF THE INVENTION

1. Field of the Invention

The present invention relates to a heterogeneous process for preparing conjugated diene butyl rubber, containing conjugated unsaturation in the linear backbone thereof.

2. Description of the Prior Art

The expression "butyl rubber" is used in the rubber industry to describe copolymers made from a polymerization reacted mixture having therein from 70 to 99.5 percent by weight of an isoolefin which has about 4 to 7 carbon atoms, e.g., isobutylene, and about 30 to 0.5 percent by weight of a conjugated multiolefin having from about 4 to 14 carbon atoms, e.g., isoprene. The resulting copolymers contain 85 to 99.5 percent by weight of combined isoolefin and about 0.5 to 15 percent of combined multiolefin. The preparation of butyl rubber is described in U.S. Pat. No. 2,356,128, which is incorporated herein by reference.

The polymer backbone of commercial butyl rubber is made up primarily of isobutylene units, with just a few percent of isoprene units. The isoprene units contribute the small amount of unsaturation present in butyl rubber. The basic preparative equations are represented by:

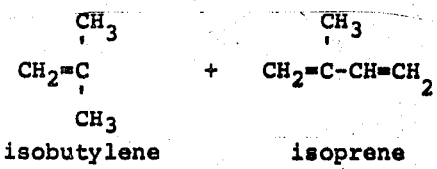

which combine to form:

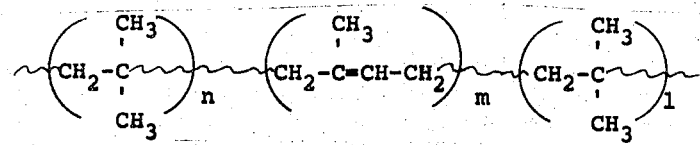

where $n + 1$ represent the number of isoolefin units incorporated in the butyl rubber, while m represents the number of diolefin units incorporated, substantially as randomly inserted units. The conjugated olefin loses its diene unsaturation upon its incorporation into the polymer backbone.

Thus, butyl rubber, as presently produced, contains only a small percentage of unsaturation, in the form of the single double bond associated with the isoprene residue which is incorporated more or less randomly throughout the polymer chain.

Halogenated butyl rubber has been developed in recent years and has contributed significantly to the elastomer business. A method of preparing halogenated butyl rubber is described in U.S. Pat. No. 3,099,644, which is incorporated herein by reference. Both chlorinated and brominated butyl rubber are known in the art. The formula for halogenated butyl rubber is schematically typified by:

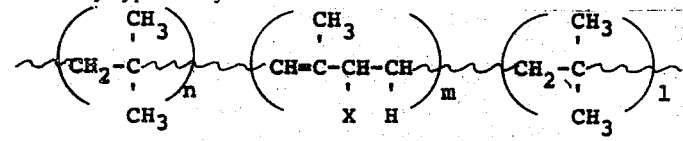

where $n$, 1 and $m$ have the same values as for butyl rubber, described above, through this structure is but one of several which can be formed, depending on the conditions of halogenation, the halogenating agent used, etc.

A copending application, Ser. No. 228,728, filed Feb. 23, 1972, now U.S. Pat. No. 3,775,387, teaches and claims a semi-homogeneous process for preparing butyl rubber containing unsaturation in the linear polymer backbone. The semi-homogeneous process comprises contacting a solution of halogenated butyl rubber with: (1) a soluble metal carboxylate, where the metal is selected from the metals of Groups Ib, IIb, IVa and VIII of the Periodic Table; (2) a soluble carboxylic acid; and (3) an oxide or hydroxide of a metal selected from Groups Ia or IIa of the Periodic Table.

SUMMARY OF THE INVENTION

We have now discovered a novel heterogeneous process for preparing butyl rubber containing conjugated unsaturation in the linear polymer backbone. The heterogeneous process of the present invention produces a composition having the formula:

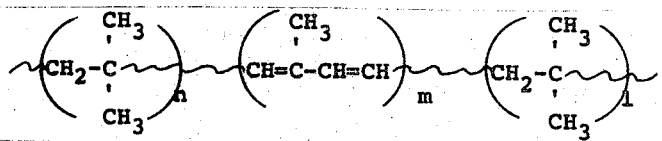

where $n + 1$ represent the number of isoolefin units incorporated in the butyl rubber polymer backbone, and m represents the number of conjugated diolefin units present, substantially as isolated units.

The heterogeneous process for preparing the conjugated diene-containing butyl rubber comprises contacting a solution of halogenated butyl rubber with a catalyst comprising a strong mineral acid salt of a metal selected from the metals of Groups IIa and IIb of the Periodic Table, for a time sufficient to dehydrohalogenate at least a portion of said halogenated butyl rubber, at a temperature of from 100° to 220°C. and recovering the butyl rubber containing more than about 0.4 mole percent conjugated diene unsaturation in the polymer.

More particularly, the invention is directed to dehydrohalogenating a halogenated copolymer consisting of from 85 to 99.5 percent by weight of an isoolefin having from 4 to 7 carbon atoms, combined with 15 to 0.5 percent by weight of a conjugated diolefin having from about 4 to 14 carbon atoms, comprising contacting, in a reaction zone, a solution of said halogenated copolymer with a salt of a strong mineral acid, selected from the group consisting of phosphate, sulfate, chloride, and nitrate, of calcium or zinc, the minimum weight ratio of rubber to salt being about 100 to 1 (based on residence time) at a temperature of from 130°C. to about 180°C. for a time sufficient to at least partially dehydrohalogenate said halogenated butyl rubber; and recovering said copolymer, having a reduced halogen content, which is characterized by having conjugated diene unsaturation in the linear backbone of said copolymer.

DESCRIPTION OF THE PREFERRED EMBODIMENTS

In simplified terms, the process of the present invention comprises dehydrohalogenation of halogenated butyl rubber to produce a butyl rubber of reduced halogen content and which has conjugated diene groups more or less randomly inserted along the linear backbone of the butyl rubber.

The product produced by the process of this invention is fully described and claimed in copending application for U.S. Letters Pat., Ser. No. 228,727, filed Feb. 23, 1972, by the present applicant and Francis P. Baldwin.

Halogenated butyl rubber is commercially available and may be prepared by halogenating butyl rubber in a solution containing 1 to 60 percent by weight butyl rubber in a substantially inert $C_5$-$C_8$ hydrocarbon solvent such as pentane, hexane, heptane, toluene, etc. and contacting this butyl rubber cement with a halogen gas for a period of about 2-25 minutes. There is then formed the halogenated butyl rubber and a hydrogen halide, the copolymer containing up to one or somewhat more, especially in the case of bromine, halogen atom per double bond initially present in the copolymer. This invention is not intended to be limited in any way by the manner in which butyl rubber is halogenated, and both chlorinated and brominated butyl rubber are suitable for use in this invention.

Illustrative of halogenated butyl rubber is Enjay CHLOROBUTYL HT-1068 (a chlorinated butyl rubber prepared from a butyl rubber having ~1.8 mole percent unsaturation and a viscosity average molecular weight of about 450,000). However, for the purposes of this invention, it is preferred that the butyl rubber starting material have incorporated therein from about 0.5 to 6 mole percent of combined diolefin, more preferably 0.5 to 3 percent, e.g., about 2 percent.

Butyl rubber generally has a number average molecular weight of about 5,000 to about 500,000, preferably about 80,000 to about 250,000, especially about 100,000 to about 200,000, and a Wijs Iodine No. of about 0.5 to 50, preferably 1 to 15.

Dehydrohalogenation is a known chemical reaction and reagents commonly used are listed, for example, on p. 1308 of "Reagents for Organic Synthesis" by Louis F. and Mary Fieser (John Wiley and Sons, Inc., N.Y., 1967). Among these are, for examples t-butylamine, N,N-dimethylformamide, calcium carbonate, potassium t-butoxide, sodium iodide in 1,2-dimethoxyethane, etc.

These methods and reagents have been employed with low molecular weight materials where homogeneous contacting of the material to be dehydrohalogenated with the dehydrohalogenating reagent is effected at high concentration, where compound and reagent solubilization can be effected by the use of polar solvents, e.g., dimethylsulfoxide, ethanol, diethyl ether, etc.

In high polymers where the halogen is present in the polymer only in small percentages, where the polymer is not soluble in polar solvents and where the concentration of the halogen containing polymer is limited by the high viscosity of polymer solutions in solvents, these methods of dehydrohalogenation are not suitable for producing the compositions of the present invention. Moreover, even in the case where the dehydrohalogenating reagent is hydrocarbon soluble, undesirable side reactions occur, which prevent formation of the products of this invention.

For example, dehydrohalogenation by tertiary amines can be considered conventional. The side reaction here is the formation of quaternary salts as in reaction 1.

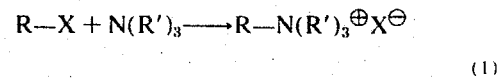

(1)

where X = halogen.

These salts when embedded in a medium of low dielectric constant (i.e., the polymer itself) lead to associated ionic complexes. In a high polymer this manifests itself in psuedo crosslinking leading to enormous increases in viscosity and gelation.

In summary then the most effective conventional reagents are insoluble in the systems of concern, and the soluble conventional reagents give undesirable side reactions.

The present heterogeneous process overcomes the above disadvantages without resorting to a soluble catalyst system and its associated difficulties. The present invention may be practiced in an extremely simple manner, e.g., using a fixed bed reactor wherein a solution of the halogenated butyl rubber is merely passed through the catalyst bed. Residence time and contacting temperature would then determine the degree of dehydrohalogenation. Thus, for the first time, a heterogeneous process would be available that would provide for the production of a butyl rubber product having a controlled, variable degree of dehydrohalogenation.

Alternatively, the present process could be practiced in a stirred reactor wherein the heterogeneous catalyst system could be maintained in suspension. Consequently, existing equipment could be easily converted for use with the present process.

Using either method, as described above, the conjugated diene containing butyl rubber may be prepared by contacting a solution of the halogenated butyl rubber with a strong mineral acid salt of a Group IIa or IIb metal, at a temperature of from 100° to 220°C. Typical of the metals of Groups IIa and IIb of the Periodic Table are calcium and zinc.

The halogenated butyl rubber is first dissolved in a suitable organic solvent such as a $C_5$-$C_{10}$ substantially inert hydrocarbon, such as pentane, hexane, heptane, mineral spirits, cyclohexane, toluene, benzene, xylene, n-decane and mixtures thereof. In addition, halogenated aromatic solvents have been found to be useful in the invention. To the halogenated butyl rubber solution is added the strong mineral acid salts of the metals of Group IIa or IIb of the Periodic Table. The reactor containing these ingredients is then heated, usually at a temperature below about 220°C. depending upon the particular solvent used and the temperature above or below which the polymer is soluble in a particular solvent, the residence time, and ingredient concentrations present. Generally, the temperature for the reaction will be between 130° and 180°C., with the most preferred temperature being in the range of 140° to 165°C.

The reaction period may be for a period of time ranging from 0.1 to 24 hours, depending on composition of the copolymer (i.e. brominated or chlorinated), concentration of the ingredients present in the reaction zone, the level or degree of dehydrohalogenation desired, temperature, or any combination of these variables. Preferably, the time for essentially complete conversion to the conjugated diene product is from about 0.1 to about 3 hours.

Especially useful are the strong acid salts of calcium (e.g., calcium salts of phosphoric, sulfuric, hydrochloric and nitric acid). While useful in preparing the compositions of the present invention, potential toxicity problems which could be encountered in practicing the present invention might limit the use of certain metals, such as cadmium.

Tricalcium orthophosphate and calcium choride are the most preferred reagents in the present invention. However, in dehydrohalogenating the halogenated butyl rubber, according to the present invention, zinc chloride would not be suitable due to its action as an effective Friedel-Crafts catalyst, and its solubility in some polymer solvents (e.g., aromatics) which may lead to molecular weight degradation or crosslinking of the halogenated polymers, depending on the structure of the polymer and the solvent system used. The principal requirements in selecting the appropriate metal salt are that it should not be soluble in the polymer solvent at elevated temperatures and that the salt should not be an active Friedel-Crafts catalyst.

The amount of catalyst used in the reactor depends upon the residence time of the halogenated butyl rubber in contact with the catalyst. Thus, this would be more critical in a continuous flow reactor where the rubber solution would pass over a fixed bed of catalyst. Space velocity of the rubber solution would be controlled, depending on the degree of dehydrohalogenation desired in the rubber.

Good mixing is required in a suspended catalyst reactor to insure adequate contact of the rubber with the catalyst. In a continuous process, provision would be made for adding makeup catalyst to the reactor, to replace catalyst fed over with the dehydrohalogenated rubber cement. The catalyst could be deposited on a substrate or used in its original form as a powder. If it is deposited on a substrate, the mode of deposition should be such as to provide an excess of metal atoms at the outer surface.

Pressure is used to prevent loss of solvent. Consequently, the pressure may range from atmospheric to 500 psi, depending on whether the solvent is a low or high boiling liquid.

The reactor should be operated with an inert atmosphere or be completely filled. For example, if a suspended catalyst system is used in a stirred reactor where there is a vapor space, oxygen should be excluded from the vapor by use of inert gas blanketing, said gas being for examples, nitrogen or solvent vapor.

Catalyst use should be based on a weight ratio that would insure that 100 lbs. of rubber would be in contact with a minimum of at least 1 lb. of salt during the rubber's residence time in the reactor. Practically speaking, this could require actual use of up to 10 lbs. of salt per 100 lbs. of rubber, or more. As stated above, if a fixed bed reactor is used, space velocity of the rubber solution is the determining factor in producing a desired level of dehydrohalogenation in the rubber at given operating temperature and solution concentration. This in turn depends upon the length of the catalyst bed and other factors, including the particular catalyst used.

Contact time of the rubber solution in the presence of catalyst will normally be between 5 minutes to several hours at the recommended temperatures. Preferred are contact times of from 30 to 60 minutes to achieve maximum conversion to the conjugated diene rubber product.

In the finishing operation, the HCl byproduct of the conversion should be removed from the rubber cement in order to prevent cross-linking of the conjugated diene product.

It has been found that the mole percent of conjugated diene unsaturation, in the products of this invention, run from about 0.4 to about 2.5.

The predominant structure of the conjugated diene-containing butyl rubber, produced by the process of the invention, is thought to be

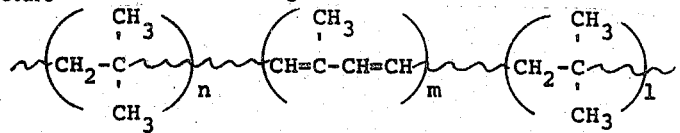

where $n$, $m$ and $l$ have the values previously described, though other structures may be present. When the starting halobutyl is a chlorinated butyl rubber, the above structure is thought to dominate. However, there may be randomly inserted conjugated diene units having the general structure:

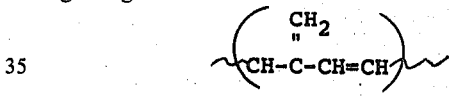

The present invention includes both structures, since their presence depends to a large extent on starting polymer, rather than process conditions. Process conditions and reagents used can influence the degree to which the possible geometrical isomers associated with these structures occur in the final conjugated diene product.

Recovery of the converted halogenated butyl can be accomplished by precipitation in acetone or some other suitable hydrocarbon material, such as an alcohol, or solvent stripping with steam and hot water and subsequent drying. This method of producing conjugated diene butyl (sometimes referred to herein as CDB) provides for removal of up to 90 percent, and more, of the halogen present in the halogenated butyl rubber being converted.

The conjugated diene-containing butyl rubber of this invention may be cured by a variety of methods, e.g., sulfur, sulfur-containing curing agents, polyfunctional dienophiles, and the like. Typical polyfunctional dienophiles are m-phenylene-bis-maleimide; ethylene glycol dimethacrylate; and trimethylol propane trimethacrylate. Monofunctional dienophiles suitable for further modification of the polymer are cis-2-butene diol; maleic anhydride; acrylic acid; crotonaldehyde; and the like. These are merely well known examples. There are many more polyfunctional and monofunctional dienophiles, known in the art that will cure, and modify, respectively, the compositions produced by the process of this invention.

The sulfur-containing curing agents are known in the art, and along with sulfur, are useful in curing the compositions produced by this invention.

The conjugated diene-containing compositions may also be covulcanized with other general purpose rubbers such as the high unsaturation rubbers, natural rubber, SBR (a butadienestyrene rubber known formerly as GR-S) and the like. The amount of high unsaturation rubber that can be blended with the conjugated diene rubber of this invention is from 10 to 90 weight percent.

A more complete understanding of the present invention can be obtained by reference to the following examples.

EXAMPLE 1

A 250 ml. glass, vapor jacketed reactor, fitted with stirrer and reflux condenser on reactor and jacket, was charged with 50 grams of a 5 percent by weight n-decane solution of chlorinated butyl rubber (Chlorobutyl HT-1068, manufactured by Enjay Chemical Company), previously purified of the stabilizers by solution in n-hexane, centrifugation of the suspended solids, recovery of the purified rubber by boiling off the solvent in a steam/water bath and drying in a vacuum oven at 50°C. 0.1 gram of tricalcium orthophosphate was added to the rubber solution with stirring and the reactor blanketed with nitrogen.

The vapor jacket, charged with mesitylene, was then brought to reflux leading to a reactor temperature of about 163°C. After 5, 10, 15, 20 and 30 minutes of heating with stirring, 0.3 ml. samples were withdrawn from the reactor, and immediately diluted with 10 ml. of spectral quality isooctane.

The samples were submitted for UV analysis, the results of which are in Table I.

TABLE I

UV ANALYSIS ($A_{max}$ at 245 nm)[1]

| Sample | Reaction Time, min. | Mole % Conjugated Diene |
|---|---|---|
| A | 0 | 0 |
| B | 5 | 0.79 |
| C | 10 | 1.18 |
| D | 15 | 1.52 |
| E | 20 | 1.71 |
| F | 30 | 1.91 |

[1] nm = nanometers

The material remaining in the reactor, which was allowed to cool to ambient temperature after 60 minutes total heating time, was removed from the reactor and diluted with about 100 ml. n-hexane, and centrifuged to eliminate the tricalcium orthophosphate in suspension. The rubber was recovered with 99 percent isopropanol and dried in a vacuum oven at 50°C.

A chlorine analysis indicated a halogen content of 0.05 percent wt. Since the original chlorobutyl rubber utilized had a halogen content of 1.19 percent wt., the chlorine removed during reaction amounts to 95.8 percent.

A sample of the recovered rubber was submitted for $1_H$ CAT (computer averaged time) nuclear magnetic resonance at 100 $MH_z$. The conjugated olefinic protons are shown in the spectrum between $\delta=5$ and $\delta=6$ ppm. The integration of the various peaks indicates a molar content in conjugated diene units of 2.2 percent, in good agreement with the UV data. The theoretical molar content of conjugated diene units is approximately 1.85 percent.

EXAMPLE 2

The procedure of Example 1 was repeated utilizing 3.44 g. of $CaCl_2$ instead of tricalcium orthophosphate.

After 10, 20, 30, 45, 60, 90 and 135 minutes of heating with stirring, 0.3 ml. samples of the rubber solution undergoing reaction were withdrawn from the reactor with a calibrated microsyringe and each then immediately diluted with 10 ml. of spectral quality isooctane.

The samples were submitted for UV spectral analysis. The results are found in Table II below.

TABLE II

UV ANALYSIS ($A_{max}$ at 245 nm)

| Sample | Reaction Time, min. | Mole % Conjugated Diene |
|---|---|---|
| A | 0 | ± 0 |
| B | 10 | 0.07 |
| C | 20 | 0.11 |
| D | 30 | 0.16 |
| E | 45 | 0.24 |
| F | 60 | 0.63 |
| G | 90 | 1.63 |
| H | 135 | 1.82 |

At the end of the heating period, the rubber was recovered as described in Example 1. A chlorine analysis indicated a halogen content of 0.14 percent. Since the original Chlorobutyl rubber utilized had a halogen content of 1.19 percent wt., the chlorine removed during reaction amounts to 88.2 percent

EXAMPLE 3

A 50 liter glass reactor, fitted with a mechanical stirrer and a reflux condenser was charged with 18.3 liters of n-decane and 1.925 Kg. of diced CHLOROBUTYL HT-1068 (Enjay Chemical Company) previously purified as done in Example 1.

The glass reactor, containing the n-decane and the chlorinated butyl rubber, was blanketed with nitrogen and subsequently heated in an oil bath at 50°C. with stirring to obtain a rubber solution to which was added 29.5 g. of tricalcium orthophosphate. The resulting slurry was heated, under stirring up to 164°C. in about 30 minutes by increasing the temperature of the oil bath.

The system was kept at 164°C. for a further 90 minutes under stirring, after which time the reactor was cooled and the rubber was precipitated by addition of 20 liters of 99 percent isopropanol.

The supernatant fluid was siphoned off and the rubber redissolved in 30 liters of n-hexane. The solution was then centrifuged to eliminate the suspended tricalcium orthophosphate and subsequently 2.0 g. of Antioxidant 2246 was added.

The rubber was then recovered by boiling off the n-hexane in a steam/water bath and dried in a vacuum oven at 50°C.

Analysis of the rubber product is shown in Table III below.

TABLE III

ANALYTICAL DATA FOR EXAMPLE 3

| Determination | Feed Polymer | Reaction Product |
|---|---|---|
| Cl, % wt. | 1.19 | 0.10 |
| Molecular Weight ($\overline{M}_r$)[1] | 450,000 | 210,000 |
| Wijs Iodine Number | 6.8 | 12.9 |

[1] The molecular weight determination was obtained by solution viscometry in diisobutylene at 25°C. using the formula $(\eta) = 36 \times 10^{-5} \overline{M}_r^{0.69}$.

The above data shows that 91.6 percent wt. of the chlorine originally present in the rubber had been effectively removed and that the iodine number had increased.

Ultraviolet spectrometric determinations indicated that the product contained 1.92 mole percent of conjugated diene unsaturation.

CURE DETERMINATION:

A sample of the rubber product was mixed with 4.50 g. of m-phenylene-bis-maleimide per 100 g. of rubber and heated for 1.5 hours at 160°C. in a curing mold. The crosslinked product displayed a swelling ratio (wt. of sample + wt. of solvent/wt. of sample) in cyclohexane of 3.41, indicating a highly crosslinked network.

An insolubilization greater than 95 percent of the polymer was found by drying and reweighing the swollen sample.

EXAMPLE 4

A 250 ml. glass reactor, as described in Example 1, was charged with 50 g. of a 5 percent wt. n-decane solution of a brominated butyl rubber (Polysar X2, manufactured by Polymer Corporation) previously purified, as described in Example 1.

To this was added 0.1 g. of tricalcium orthophosphate with stirring of the reaction contents, and the reactor blanketed with nitrogen.

The vapor jacket was charged with xylene and brought to reflux leading to a reactor temperature of 133°C.

After 10, 20, 30, 45 and 60 minutes of heating with stirring 0.3 ml. samples were withdrawn from the reactor in the usual manner. The samples were submitted for UV analysis. The results are in Table IV below.

TABLE IV

UV ANALYSIS (Amax at 245 nm)

| Sample | Reaction Time, min. | Mole % Conjugated Diene |
|---|---|---|
| A | 0 | 0.10 |
| B | 10 | 1.02 |
| C | 20 | 1.36 |
| D | 30 | 1.49 |
| 3 | 45 | 1.81 |
| F | 60 | 1.99 |

A bromine analysis indicated a halogen content of 0.12 percent wt. Since the original brominated butyl rubber utilized had a halogen content of 2.1 percent wt., the bromine removed during the reaction was 94.3 percent.

EXAMPLES 5-8

The procedure of Example 1 was repeated utilizing each of the following metal salts:

Run (5) 1.15 grams of calcium diacid orthophosphate
(6) 1.93 grams of zinc orthophosphate
(7) 0.95 grams of zinc monoacid phosphate
(8) 1.5 grams of zinc diacid phosphate After 30, 60, 90 minutes of heating with stirring, 0.3 ml. samples of the rubber solution undergoing reaction were withdrawn from the reactor with a calibrated microsyringe and each then immediately diluted with 10 ml. of spectral quality isooctane.

The samples were submitted for UV spectral analysis. The results are shown in Table V, below.

TABLE V

UV ANALYSIS (Amax at 238 nm)

| Run | Sample | Reaction Time, min. | Mole % Conjugated Diene |
|---|---|---|---|
| 5 | A | 0 | 0 |
|   | B | 30 | 0.43 |
|   | C | 60 | 0.96 |
|   | D | 90 | 1.08 |
| 6 | A | 0 | 0 |
|   | B | 30 | 0.65 |
|   | C | 60 | 1.31 |
|   | D | 90 | 1.90 |
| 7 | A | 0 | 0 |
|   | B | 30 | 0.43 |
|   | C | 60 | 0.85 |
|   | D | 90 | 1.31 |
| 8 | A | 0 | 0 |
|   | B | 30 | 0.18 |
|   | C | 60 | 0.34 |
|   | D | 90 | 0.57 |

At the conclusion of the heating period, the rubber was recovered as described in Example 1. A chlorine analysis performed on the final product, the results being reported, below, in Table VI. The original chlorinated butyl rubber had a halogen content of 1.19 percent by weight.

TABLE VI

CHLORINE REMOVED

| Run | Cl on Rubber After Reaction (%) | Cl Removed (%) |
|---|---|---|
| 5 | 0.86 | 28.03 |
| 6 | 0.10 | 91.6 |
| 7 | 0.70 | 41.7 |
| 8 | 0.89 | 25.8 |

What is claimed is:

1. A heterogeneous process for preparing a copolymer consisting of from 85 to 99.5 percent by weight of an isoolefin having from 4 to 7 carbon atoms, combined with 15 to 0.5 percent by weight of a conjugated diolefin having from 4 to 14 carbon atoms, containing in the linear backbone conjugated diene unsaturation, which comprises contacting a solution of said copolymer which has been halogenated, in a reaction zone, with a metal salt of a strong acid wherein said metal is selected from the metals of Group IIa or IIb of the Periodic Table; provided, however, that said salt is not a Friedel-Crafts catalyst, there being at least 1 part by weight salt present for contact with 100 parts by weight of said halogenated copolymer, at a temperature of from 100° to 220°C., for a time sufficient to dehydrohalogenate said halogenated copolymer, and recovering the copolymer having a reduced halogen content, which is characterized by having random units of conjugated diene unsaturation.

2. A heterogeneous process for dehydrohalogenating a halogenated copolymer consisting of from 85 to 99.5 percent by weight isobutylene, combined with 15 to 0.5 percent by weight isoprene, having a number average molecular weight of about 5,000 to 500,000 to form the dehydrohalogenated copolymer characterized by having random units of conjugated diene unsaturation comprising contacting a solution of halogenated copolymer, in a reaction zone with a hydrocarbon insoluble metal salt of a strong acid wherein the metal is selected from the metals of Group IIa or IIb, at a temperature of from 130° to 180°C., there being at least from 1 to 10 parts by weight salt in contact with 100 parts of said halogenated copolymer, and said metal salt not being a Friedel-Crafts catalyst, said contact of metal salt with the halogenated copolymer being for a time sufficient to dehydrohalogenate the halogenated copolymer, and recovering said copolymer having a reduced halogen content.

3. The heterogeneous process of claim 1, wherein the catalyst is a metal salt of a strong acid wherein the metal salt is a phosphate, sulfate, chloride and nitrate, of a metal selected from the metals of Groups IIa and IIb of the Periodic Table; provided, however, that the metal salt is not a Friedel-Crafts catalyst.

4. The heterogeneous process of claim 3, wherein the Group IIa metal is calcium.

5. The heterogeneous process of claim 3, wherein the Group IIb metal is zinc, and further wherein said catalyst is not a Friedel-Crafts catalyst.

6. The heterogeneous process of claim 1, wherein said catalyst is tricalcium orthophosphate.

7. The heterogeneous process of claim 1, wherein said catalyst is zinc orthophosphate.

8. The heterogeneous process of claim 1, wherein said catalyst is calcium sulfate.

9. The heterogeneous process of claim 1, wherein said catalyst is calcium chloride.

10. The heterogeneous process of claim 1, wherein the solution of halogenated butyl rubber is contacted with the strong acid salt of a Group IIa or IIb metal in a reaction zone characterized by having a fixed bed of said metal salt catalyst.

11. The heterogeneous process of claim 1, wherein the solution of halogenated butyl rubber is contacted with the strong acid salt of a Group IIa or IIb metal suspended in the reaction medium in stirred reaction zone.

* * * * *